UNITED STATES PATENT OFFICE.

ANSON A. DE PUY, OF SAN FRANCISCO, CALIFORNIA.

FOOD COMPOUND.

SPECIFICATION forming part of Letters Patent No. 331,775, dated December 8, 1885.

Application filed July 1, 1885. Serial No. 170,430. (No specimens.)

*To all whom it may concern:*

Be it known that I, ANSON A. DE PUY, a resident of the city and county of San Francisco, and State of California, have invented or discovered an Improved Food Compound; and I do hereby declare that the following is a full, clear, and exact description thereof.

My invention relates to a new food compound.

It consists in combining together the following-named ingredients in about the proportions specified, and mixing the resulting compound with cow's milk.

Following is the formula which I use, viz: sugar, three and a half (3½) pounds; nitrate of potash, six (6) ounces; glycerine, four (4) ounces; bicarbonate of soda, six (6) ounces; protoxide of soda, six (6) drams; chloride of sodium, twenty (20) ounces; water, six (6) gallons. Add caramel to give the desired color. I then add one quart of this mixture to three gallons of cow's milk.

This compound or mixture produces a food which is entirely nutritive and sanative in its character, and which can be used as a substitute for pure milk with very beneficial results. It produces a fluid which has every appearance and about the density of good rich milk. The lactic acid of the milk which is added to the mixture is neutralized by the alkaline character of the compound, so that decomposition is arrested, thus causing it to keep sweet for a great length of time. The mixture can also be transported without fear of the milk which it contains being churned, as in the case of pure milk. Neither will it be injuriously affected in warm or hot weather.

I am aware that a compound for the preservation of milk and cream, consisting of soda, salt, burnt sugar, cream tartar, saltpeter, and white sugar dissolved in water, has heretofore been patented, and I distinctly disclaim such compound as not my invention.

Having thus described my invention, what I claim, and desire to secure by Letters Patent, is—

A food compound consisting of sugar, nitrate of potash, glycerine, bicarbonate of soda, protoxide of soda, chloride of sodium, water, and milk, combined and prepared in the proportions substantially as herein specified.

In witness whereof I have hereunto signed my name.

ANSON A. DE PUY.

Witnesses:
JAMES L. KING,
W. P. SMITH.